US012023902B2

(12) United States Patent
Takahashi (10) Patent No.: US 12,023,902 B2
(45) Date of Patent: Jul. 2, 2024

(54) GLASS ASSEMBLY WITH RESIN FRAME FOR VEHICLE WINDOW (71) Applicant: AGC Inc., Tokyo (JP)

(72) Inventor: Kazuhiro Takahashi, Tokyo (JP)

(73) Assignee: AGC INC., Tokyo (JP)

( * ) Notice: Subject to any disclaimer, the term of this patent is extended or adjusted under 35 U.S.C. 154(b) by 274 days.

(21) Appl. No.: 17/714,041

(22) Filed: Apr. 5, 2022

(65) Prior Publication Data

US 2022/0324300 A1 Oct. 13, 2022

(30) Foreign Application Priority Data

Apr. 7, 2021 (JP) .................. 2021-065230

(51) Int. Cl.
B32B 3/06 (2006.01)

(52) U.S. Cl.
CPC ............ B32B 3/06 (2013.01); B32B 2315/08 (2013.01)

(58) Field of Classification Search
CPC .............................. B32B 3/06; B32B 2315/08
USPC ....................................................... 428/192
See application file for complete search history.

(56) References Cited

U.S. PATENT DOCUMENTS

| 5,108,526 A * | 4/1992 | Cornils ................. E06B 3/6733 156/244.11 |
| 2003/0178394 A1* | 9/2003 | Johnson ............... B23K 1/0053 219/85.13 |
| 2004/0178961 A1* | 9/2004 | Maeuser .............. H01Q 1/1271 343/713 |
| 2005/0001456 A1* | 1/2005 | Bohm ............... B32B 17/10761 296/215 |
| 2022/0324300 A1* | 10/2022 | Takahashi ................ B60J 1/007 |

FOREIGN PATENT DOCUMENTS

| JP | 2006-051923 A | 2/2006 |
| JP | 2006-298144 A | 11/2006 |
| JP | 2008-270021 A | 11/2008 |
| JP | 3212216 U | 8/2017 |
| WO | WO-2017/188414 A1 | 11/2017 |

* cited by examiner

Primary Examiner — Betelhem Shewareged
(74) Attorney, Agent, or Firm — Foley & Lardner LLP (57) ABSTRACT A glass assembly with a resin frame for a vehicle window includes a glass plate; and a resin frame disposed on a peripheral edge area of the glass plate, wherein an electrical component disposed in a second section and an electrical connection member disposed in a first section are electrically connected together via a through hole as a relay portion interposed between a surface and an inner side surface with an adhesive applied thereto, and wherein the through hole is sealed with a sealing member.

16 Claims, 8 Drawing Sheets

GLASS ASSEMBLY WITH RESIN FRAME FOR VEHICLE WINDOW

TECHNICAL FIELD

The present invention relates to a glass assembly with a resin frame for a vehicle window, which includes an electrical component.

BACKGROUND ART

Among the glass plates for a vehicle window glass, in particular, automobile glass plates, such as sidelites (ex. front fix, front door fix, rear door fix, quarterlite fix) fixed to a vehicle window opening, have a resin frame integrally disposed to a peripheral edge area so as to fill the gap between the glass plate and the vehicle window opening in many cases. The resin frame serves not only to fix the glass plate to the vehicle window opening and seal the vehicle window opening but also to improve the cosmetic appearance of the sidelites.

The resin frame is integrally disposed to the glass plate by, e.g., applying a primer (adhesive) to the peripheral edge area of the glass plate, followed by fixing the glass plate to a mold and injecting a molten resin into the cavity of the mold. In this manner, a glass assembly with a resin frame is produced so as to have a resin frame integrally disposed to the peripheral edge area of the glass plate. The applicant discloses this type of glass assembly with a resin frame (available in the name of registered trademark "MAW" and in the product name of "Module Assy Window") in, e.g., Patent Document 1 listed below.

Patent Document 2 listed below discloses a vehicle windshield, which has a resin frame provided with an information device attaching portion configured to attach an information device thereto. Patent Document 2 also discloses a structure wherein a resin frame is integrally molded together with connector wires, which are electrically connected to an information device.

PRIOR ART DOCUMENTS

Patent Documents

Patent Document 1: JP-A-2008-270021
Patent Document 2: WO-A-2017-188414

DISCLOSURE OF INVENTION

Technical Problem

An electrical component, such as an information device, disposed on a glass assembly with a resin frame for a vehicle window is connected to, e.g., the power source of a vehicle through an electrical connecting portion, such as connector wires. In the glass assembly with a resin frame for a vehicle window, a glass plate has an adhesive applying area disposed on an inner side surface such that an adhesive is applied to the applying area so as to fix the glass assembly to a vehicle, as one example. Such a type of glass assembly with a resin frame for a vehicle window is configured such that the electrical connection portion is partly disposed in the applying area, and then the bonding to the inner side surface of the glass plate is made by an adhesive in some cases.

In this arrangement, the provision of the electrical connection portion in the adhesive applying area causes a problem in that the watertightness in the applying area reduces. This causes a problem in that moisture enters onto the inner side of a vehicle from the peripheral edge area of the glass assembly with a resin frame for a vehicle window, and the moisture comes, through the watertightness-reduced portion, on an in-plane side of the glass assembly with a resin frame for a vehicle window (causes water leakage).

As described above, the glass assembly with a resin frame for a vehicle window thus configured is problematic in terms of quality because of causing the problem of water leakage.

The present invention is proposed in consideration of such circumstances. It is an object of the present invention to provide a glass assembly with a resin frame for a vehicle window, which has good quality.

Solution to Problem

In order to attain the object of the present invention, according to one aspect of the present invention, there is provided a glass assembly with a resin frame for a vehicle window, which includes a glass plate; and a resin frame disposed on a peripheral edge area of the glass plate; the resin frame being integrally molded to the glass plate; wherein the glass assembly is configured to be mounted to a vehicle; wherein the resin frame has an adhesive applied to an inner side facing the vehicle to fix the glass assembly to the vehicle; wherein the glass assembly has an electrical component disposed on the inner side; wherein the glass assembly has an adhesive applying area where the adhesive is applied, a first section, and a second section, the first section being closer to an in-plane side of the glass assembly than the adhesive applying area, and the second section being closer to a peripheral edge side than the adhesive applying area; wherein the electrical component is disposed in one of the first section and the second section; wherein the glass assembly has an electrical connection member disposed in a section other than the section where the electrical component is disposed; and wherein the electrical component and the electrical connection member are electrically connected together via a relay portion interposed between a surface with the adhesive applied thereto, and an outer side surface as viewed in cross-section of the glass assembly.

Advantageous Effects of Invention

In accordance with the present invention, it is possible to provide a vehicle glass assembly with a resin frame, which has good quality.

DESCRIPTION OF EMBODIMENTS

Now, embodiments of the vehicle glass assembly with a resin frame according to the present invention will be described in reference to the accompanying drawings.

Figure 1:
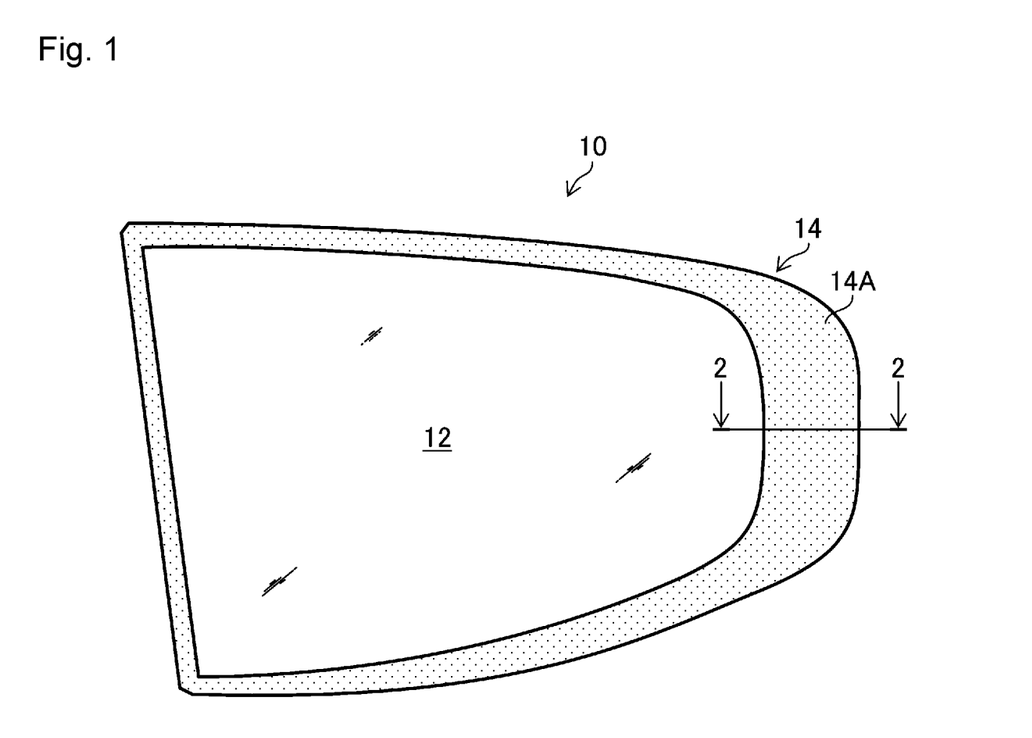
FIG. 1 is a plan view of the vehicle glass assembly with a resin frame according to a first embodiment of the present invention.
Figure 2:
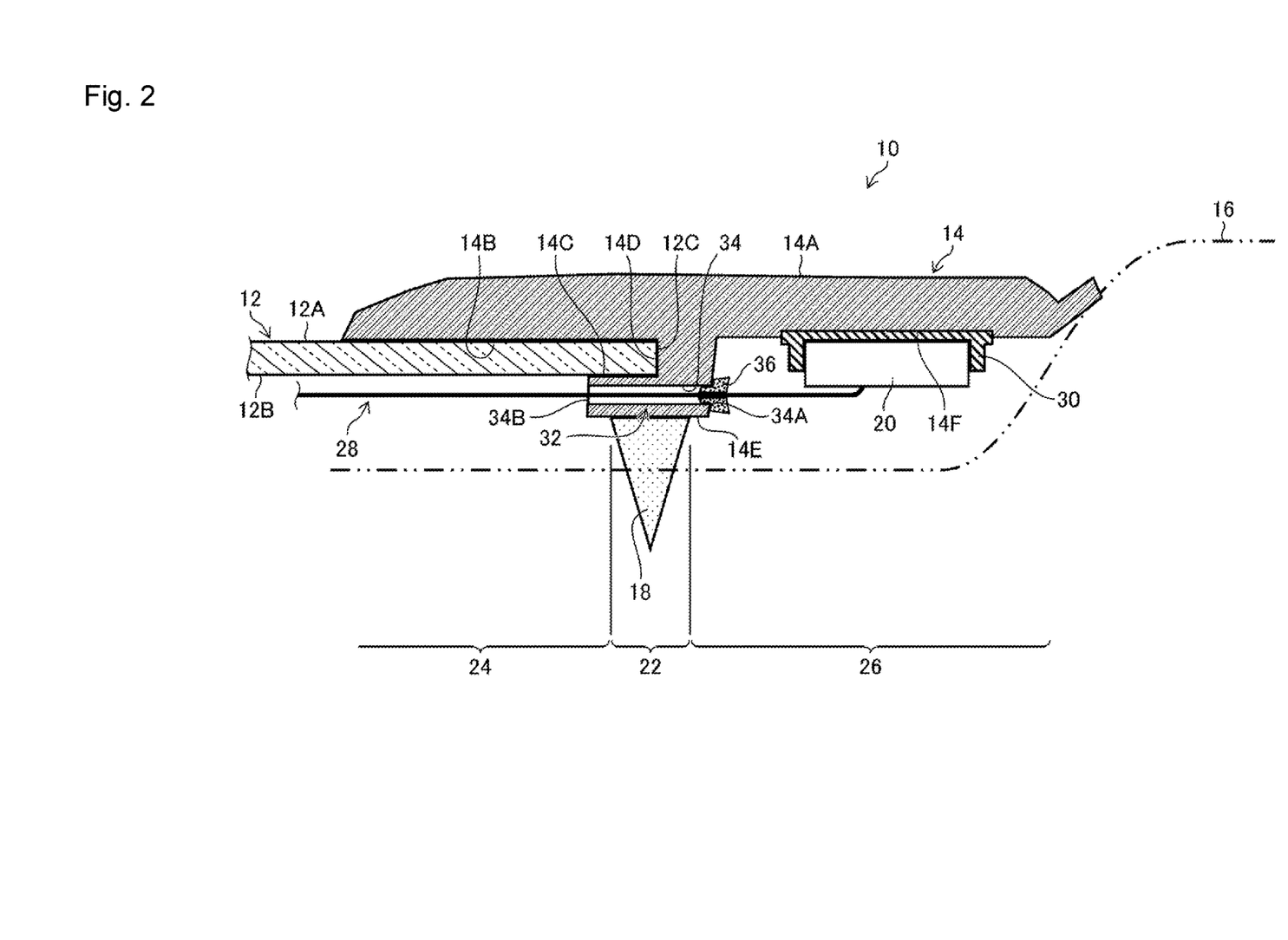
FIG. 2 is a cross-sectional view of the vehicle glass assembly with a resin frame shown in FIG. 1, taken along line 2-2 of FIG. 1.

FIG. 1 is a plan view of the vehicle glass assembly with a resin frame 10 (called "the glass assembly with a resin frame 10" for short in the following explanation) according to a first embodiment of the present invention. FIG. 2 is a cross-sectional view of the glass assembly with a resin frame 10 shown in FIG. 1, taken along line 2-2 of FIG. 1.
[Vehicle Glass Assembly with Resin Frame]

The glass assembly with a resin frame 10 shown in FIGS. 1 and 2 is a vehicle fixed window and is applicable to a vehicle rear quarter glass as one example. The glass assembly with a resin frame 10 includes a glass plate 12, and a resin frame 14 disposed on a peripheral edge area of the glass plate 12. The resin frame 14 is integrally molded to the glass plate 12. The resin frame 14 has a surface (outer side surface) 14A facing an outer side and serving as a cosmetic surface of the glass assembly with a resin frame 10 after the glass assembly with a resin frame 10 is fixed to a vehicle window opening (not shown). It should be noted that the glass assembly with a resin frame 10 is not limited to a rear quarter glass. The glass assembly with a resin frame 10 may be a front vent glass, a roof glass, a windshield or a backlite.
<Glass Plate>

The glass plate 12 shown in FIG. 1 is formed in a substantially square shape in plan view. It should be noted that the shape of the glass plate 12 is not limited to a substantially square shape, and the shape may be a substantially triangular shape or another shape. The glass plate 12 may be made of inorganic glass or organic glass. As the inorganic glass, for example, soda-lime glass, aluminosilicate glass, borosilicate glass, alkali-free glass or quartz glass is applicable without any limitation. Among them, soda-lime glass is particularly preferable from the viewpoint of production cost and moldability. There is no particular limitation to how to form the glass plate 12. For example, when the glass plate is made of inorganic glass, the glass plate is preferably formed by a float process or the like.

When the glass plate 12 is made of inorganic glass, the glass plate 12 may be made of either non-tempered glass or tempered glass. The non-tempered glass is one that is produced by forming molten glass in a plate shape and annealing the formed molten glass. The tempered glass is one that is produced by forming a compressive stress layer in the surface of non-tempered glass, and may be either one of glass tempered by air quenching, or chemically tempered glass.

When the tempered glass is physically tempered glass (such as glass tempered by air quenching), the glass surface may be tempered by, for example, conducting an operation except annealing, so as to quench a glass plate uniformly heated for bending, from a temperature close to its softening point such that a temperature difference is created between the glass surface and the inside of the glass to form a compressive stress layer in the glass surface. In contrast, when the tempered glass is chemically tempered glass, the glass surface may be tempered by, for example, causing a compressive stress in the glass surface by ion exchange treatment or the like after completion of a bending operation. Or glass that absorbs ultra-violet rays or infrared rays may be used. Although the tempered glass is preferably transparent, a glass plate that is colored to such a degree not to impair transparency may be used.

The glass plate 12 may be formed in a single bent shape bent only in a single direction or a compound bent shape bent in two or more directions (for example, in both of a certain direction and a direction orthogonal to the certain direction). In order to bend the glass plate 12, the glass plate may be bent by gravity bending, press bending, roller bending or the like. When the glass plate 12 is bent so as to have a certain radius of curvature, the glass plate 12 may have a radius of curvature set at 1,000 to 100,000 mm.

The glass plate 12 may be a single glass plate. The glass plate 12 may be laminated glass plate wherein at least two glass plates are bonded together via an interlayer, for example. The interlayer of the laminated glass may be a known thermoplastic resin film made of polyvinyl butyral (PVB) or an ethylene-vinyl acetate copolymer resin (EVA), for example. The interlayer of the laminated glass may be transparent or colored. The interlayer may have two or more layers.

When the glass plate 12 is made of laminated glass, glass plates, which are positioned on an outer side and on an inner side after the glass plate 12 is mounted to a vehicle, may have the same thickness as each other or different thicknesses from each other. The glass plate that is positioned on the outer side after the glass plate 12 is mounted to the vehicle has a thickness of preferably at least 1.0 mm and at most 3.0 mm. When the glass plate positioned on the outer side has a thickness of at least 1.0 mm, the glass plate has a sufficient strength in terms of resistance against a flipped stone or the like. When the glass plate positioned on the outer side has a thickness of at most 3.0 mm, the weight of the laminated glass can be prevented from being excessively heavy, which is preferable in terms of mileage of the vehicle. The glass plate positioned on the inner side has a thickness of preferably at least 0.3 mm and at most 2.3 mm. When the glass plate positioned on the inner side has a thickness of at least 0.3 mm, it is possible to have excellent handling. When the glass plate positioned on the inner side has a thickness of at most 2.3 mm, the weight of the laminated glass can be prevented from being excessively heavy. The thickness of each of the glass plates positioned on the outer side and the inner side has a thickness of preferably at most 1.8 mm, the glass plate 12 can have not only a sufficient weight reduction but also a sufficient sound insulation, which is preferable. When the glass plate positioned on the inner side has a thickness of at most 1.0 mm, the glass plate positioned on the inner side may be made of chemically tempered glass. When the glass plate positioned on the inner side is made of chemically tempered glass, the chemically tempered glass has a compressive stress value of preferably at least 300 MPa in the glass surface and a compressive stress layer formed therein so as to have a depth of preferably at least 2 μm.

When the glass plate is a single glass plate, the glass plate is made of preferably glass tempered by air quenching. In this case, the glass plate 12 has a thickness of preferably at least 1.8 mm and at most 5.0 mm.

When the glass plate 12 is made of organic glass, a transparent resin, such as polycarbonate or acrylic resin (for example, polymethyl methacrylate) may be mentioned as the material for the organic glass.

<Resin Frame>

The resin frame 14 is disposed so as to surround the entire periphery of the glass plate 12 in one example. The material for the resin frame 14 may be, for example, a synthetic resin, such as polyvinyl chloride (PVC), or thermoplastic elastomer (TPE). The resin frame 14 is disposed on the glass plate 12 by setting the glass plate 12 in a mold having a cavity corresponding to the shape of the resin frame, and injecting the above-mentioned synthetic resin (molten synthetic resin) into the cavity.

The resin frame 14 according to the first embodiment has a so-called three-side molding including three inner surfaces 14B, 14C and 14D in touch with an outer side surface 12A, an inner side surface 12B and an end surface 12C of the glass plate 12 as shown in FIG. 2. The resin frame 14 may have a so-called two-side molding including two inner surfaces in touch with the inner side surface 12B and the end surface 12C of the glass plate 12.

In a case where the glass assembly with a resin frame 10 according to the first embodiment is mounted to a vehicle 16 shown in a two-dot chain line in FIG. 2, the resin frame 14 has an adhesive 18 applied to a side facing the vehicle 16 for the purpose of fixing the glass assembly with a resin frame 10. Further, the glass assembly with a resin frame 10 according to the first embodiment includes an electrical component 20 disposed on the side facing the vehicle 16. Although the adhesive 18 is exaggeratedly shown and appears to have a triangular cross-sectional shape in FIG. 2 for convenience of explanation, the size and the shape of the adhesive 18 are not limited to the shown mode.

In the glass assembly with a resin frame 10 according to the first embodiment, the resin frame 14 has an applying area 22 for the adhesive 18 disposed on an inner side surface 14E on the side facing the vehicle, the inner side surface 14E being disposed on an opposite side of the inner surface 14C. When it is defined that the glass assembly with a resin frame 10 has a first section 24 on a side thereof closer to an in-plane side thereof (side adjacent the center of gravity of the glass plate 12) than the applying area 22, and a second section 26 on a side thereof closer to the peripheral edge of the glass assembly with a resin frame 10 than the applying area 22, the electrical component 20 is disposed an inner side surface 14F of the resin frame 14, which is positioned in the second section 26. An electrical connection member 28 is disposed in the first section 24 different from the second section 26 where the electrical component 20 is disposed. The electrical component 20 is fixed to the inner side surface 14F of the resin frame 14 via a bracket 30 integral with or assembled to the electrical component 20.

As one example of the electrical component 20 is applicable a distance sensor, which detects the distance to an object existing laterally of a vehicle. As one example of the electrical connection member 28 is applicable a linear member including a conductor and an insulating tube covering the conductor. As seen in a cross-sectional view of the glass assembly with a resin frame 10 shown in FIG. 2, the electrical component 20 and the electrical connection member 28 are electrically connected together via a relay portion 32, which is interposed between the surface 14A (outer side surface) of the resin frame 14 and the inner side surface 14E of the resin frame 14.

The relay portion 32 will be described specifically. The relay portion 32 of the glass assembly with a resin frame 10 according to the first embodiment is provided as a through hole 34 formed in the resin frame 14. The through hole 34 is a through hole communicating between the first section 24 and the second section 26. The electrical connection member 28 is disposed so as to pass through the through hole 34 serving as the relay portion 32. The through hole 34 includes openings 34A and 34B at both ends such that the opening 34A opening toward the second section 26 is sealed by a sealing member 36. The sealing member 36 may be a silicone sealant as one example, but is not limited to this substance.

A comparative example to be compared with the glass assembly with a resin frame 10 according to the first embodiment will be briefly described. For example, consideration will be made about a glass assembly with a resin frame as the comparative example, wherein an electrical connection member is partly disposed in an adhesive applying area, i.e., a glass assembly with a resin frame wherein an adhesive is applied so as to bridge over a portion of an electrical connection member. This comparative example causes a problem in that moisture could enter onto an in-plane side of the glass assembly with a resin frame because a gap could be formed between the adhesive and the electrical connection member in the adhesive applying area to reduce the watertightness in the adhesive applying area. It should be noted that the applying area may be set on the glass plate or the resin frame.

In contrast, in accordance with the glass assembly with a resin frame 10 of the first embodiment, even when moisture enters from the peripheral edge area of the glass assembly with a resin frame 10, the adhesive 18 used to fix the glass assembly with a resin frame 10 to the vehicle 16 can prevent the moisture from entering onto the in-plane side of the glass assembly with a resin frame 10.

In other words, the glass assembly with a resin frame 10 according to the first embodiment is configured such that the electrical component 20 disposed in the second section 26 and the electrical connection member 28 disposed in the first section 24 are electrically connected together via the through hole 34 as the relay portion 32 interposed between the surface 14A and the inner side surface 14E with the adhesive 18 applied thereto, and the through hole 34 is sealed by the sealing member 36. By this arrangement, the glass assembly with a resin frame according to the first embodiment is configured to prevent the watertightness in the applying area 22 from being reduced. Thus, the entrance of the moisture onto the in-plane side of the glass assembly with a resin frame 10 (leakage) can be avoided to provide the glass assembly with a resin frame 10 with good quality.

Regarding how to seal the through hole 34 by the sealing member 36, the opening 34B, instead of the opening 34A, may be sealed, or both of the openings 34A and 34B may be sealed. In other words, at least one of the opening 34A or the opening 34B may be sealed. The through hole 34 may be formed by carrying out boring after production of the glass assembly with a resin frame 10, or be formed during the production of the glass assembly with a resin frame 10 by use of a method wherein a hollow pipe member for defining the through hole 34 is set (placed) in a resin frame injecting mold.

Figure 3:
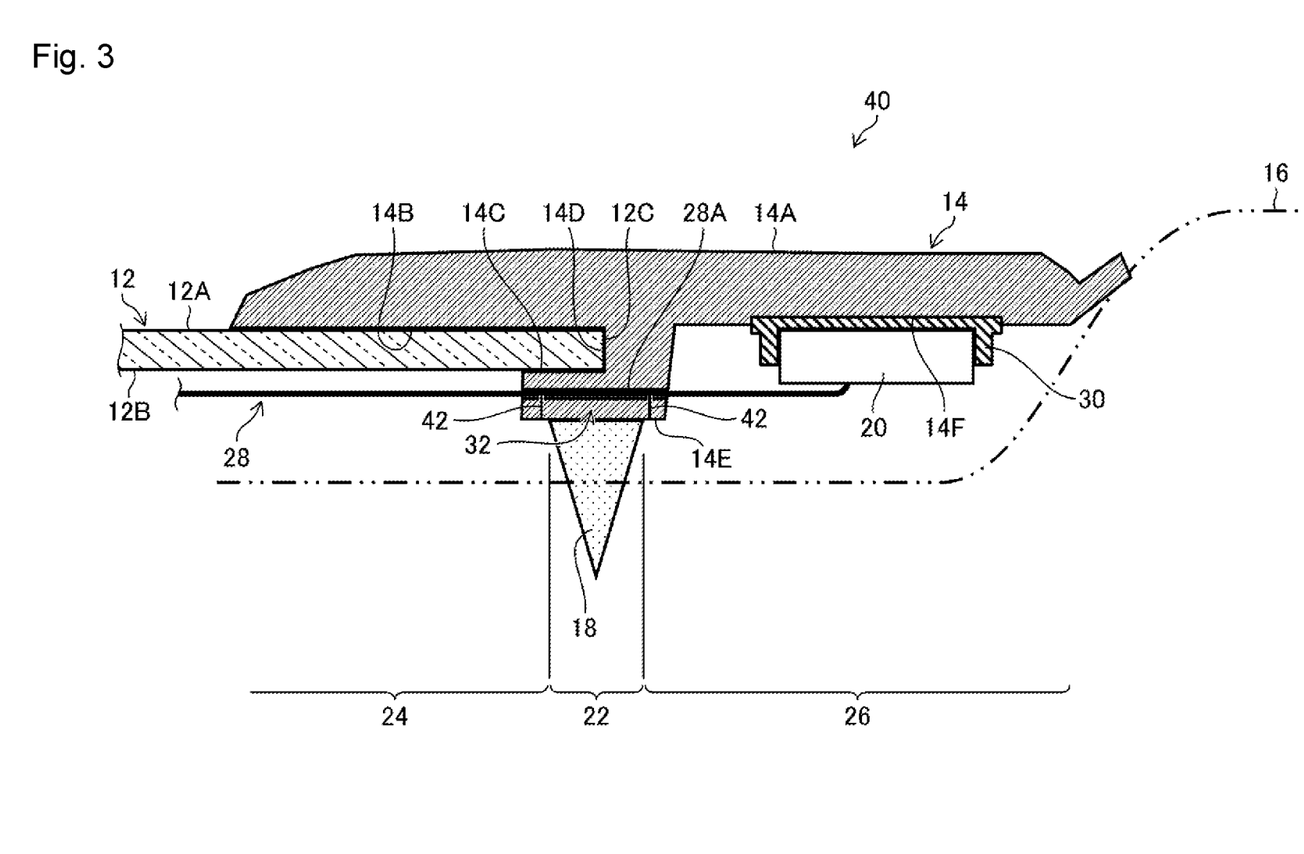
FIG. 3 is a cross-sectional view of the vehicle glass assembly with a resin frame according to a second embodiment of the present invention.

FIG. 3 is a cross-sectional view of the glass assembly with a resin frame 40 according to a second embodiment of the present invention. Regarding the explanation of the glass assembly with a resin frame 40, parts or members identical or similar to those of the glass assembly with a resin frame 10 shown in FIGS. 1 and 2 are indicated with like reference numeral, and explanation of these parts and members will be omitted.

The glass assembly with a resin frame 40 shown in FIG. 3 is configured such that an electrical connection member 28 has a portion 28A integrally molded with a resin frame 14. The glass assembly with a resin frame 40 is configured to have a relay portion 32 formed of the portion (part) 28A of the electrical connection member 28, which is integrally molded with the resin frame 14. In other words, the glass assembly with a resin frame 40 according to the second embodiment is configured to include a glass plate 12, the portion 28A of the electrical connection member 28 and the resin frame 14 formed as an integrally molded product such that the resin frame 14 and the portion 28A of the electrical connection member 28 are brought into close contact with each other. The portion 28A of the electrical connection member 28 has a primer applied to a surface thereof to further increase the close contact between the resin frame 14 and the portion 28A of the electrical connection member 28.

In accordance with the glass assembly with a resin frame 40 of the second embodiment, even when moisture enters from a peripheral edge area of the glass assembly with a resin frame 40, the provision of an adhesive 18 used to fix the glass assembly with a resin frame 40 to a vehicle 16 can prevent the moisture from entering onto an in-plane side of the glass assembly with a resin frame 40.

In other words, the glass assembly with a resin frame 40 according to the second embodiment is configured such that an electrical component 20 disposed in a second section 26 and the electrical connection member 28 disposed in a first section 24 are electrically connected together via the portion 28A (of the electrical connection member 28) as the relay portion 32 interposed between an outer side surface 14A and an inner side surface 14E with the adhesive 18 applied thereto. By this arrangement, the glass assembly with a resin frame 40 is configured such that the resin frame 14 and the portion 28A of the electrical connection member 28 are brought into close contact with each other so as to prevent the watertightness in an applying area 22 from being reduced. Thus, the entrance of the moisture onto the in-plane side of the glass assembly with a resin frame 40 (leakage) can be avoided to provide the glass assembly with a resin frame 40 with good quality.

Figure 4:
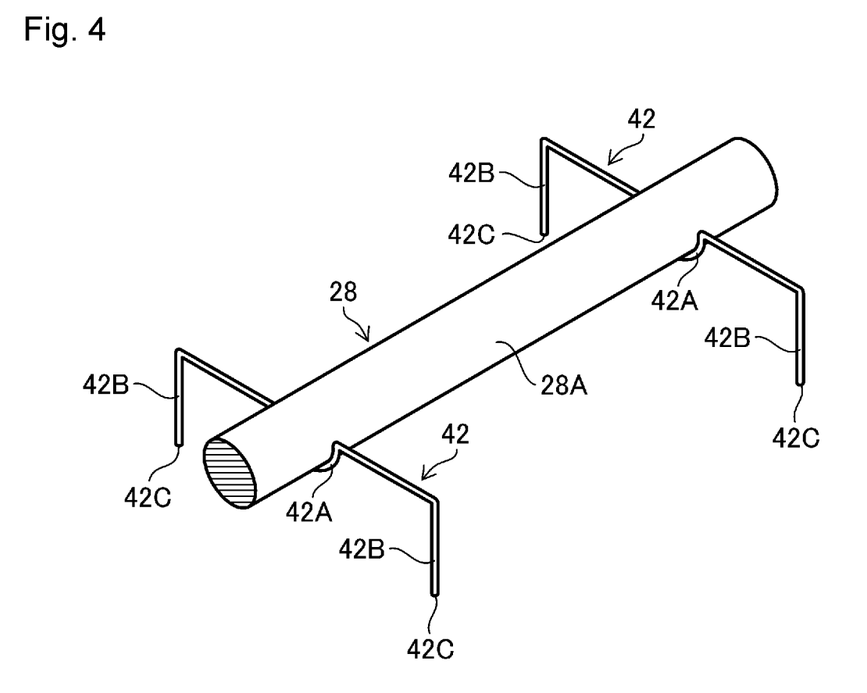
FIG. 4 is an enlarged perspective view of a portion of an electrical connection member and auxiliary members for supporting that portion.

When the glass assembly with a resin frame 40 according to the second embodiment is produced, it is preferable to utilize a pair of auxiliary members 42 and 42 shown in FIG. 4 to support the portion 28A of the electrical connection member 28 in a mold. By this arrangement, it is possible to integrally mold the portion 28A to the resin frame 14.

In the glass assembly with a resin frame 40 according to the second embodiment, at least a portion of each of the auxiliary members 42 and 42 is exposed from the surface of the resin frame 14. Specifically, a single linear member may be used to configure each of the auxiliary members 42 and 42 so as to include an arcuate portion 42A for supporting the portion 28A, and a pair of leg portions 42B and 42B placed on the cavity wall of the mold. Among the arcuate portion and the leg portions, the bottoms 42C of the leg portions 42B in contact with the mold are exposed outside from the inner side surface 14E of the resin frame 14. In other words, the glass assembly with a resin frame 40 according to the second embodiment is an integrally molded product, which includes the glass plate 12, the portion 28A of the electrical connection member 28, the auxiliary members 42 and 42, and the resin frame 14. The provision of the auxiliary members 42 and 42 in the glass assembly with a resin frame 40 according to the second embodiment can prevent the portion 28A of the electrical connection member 28 from being shifted from a desired position by an injected molten resin when the glass plate 12, the portion 28A of the electrical connection member 28, and the resin frame 14 are formed as an integrally molded product by injection molding.

Figure 5:
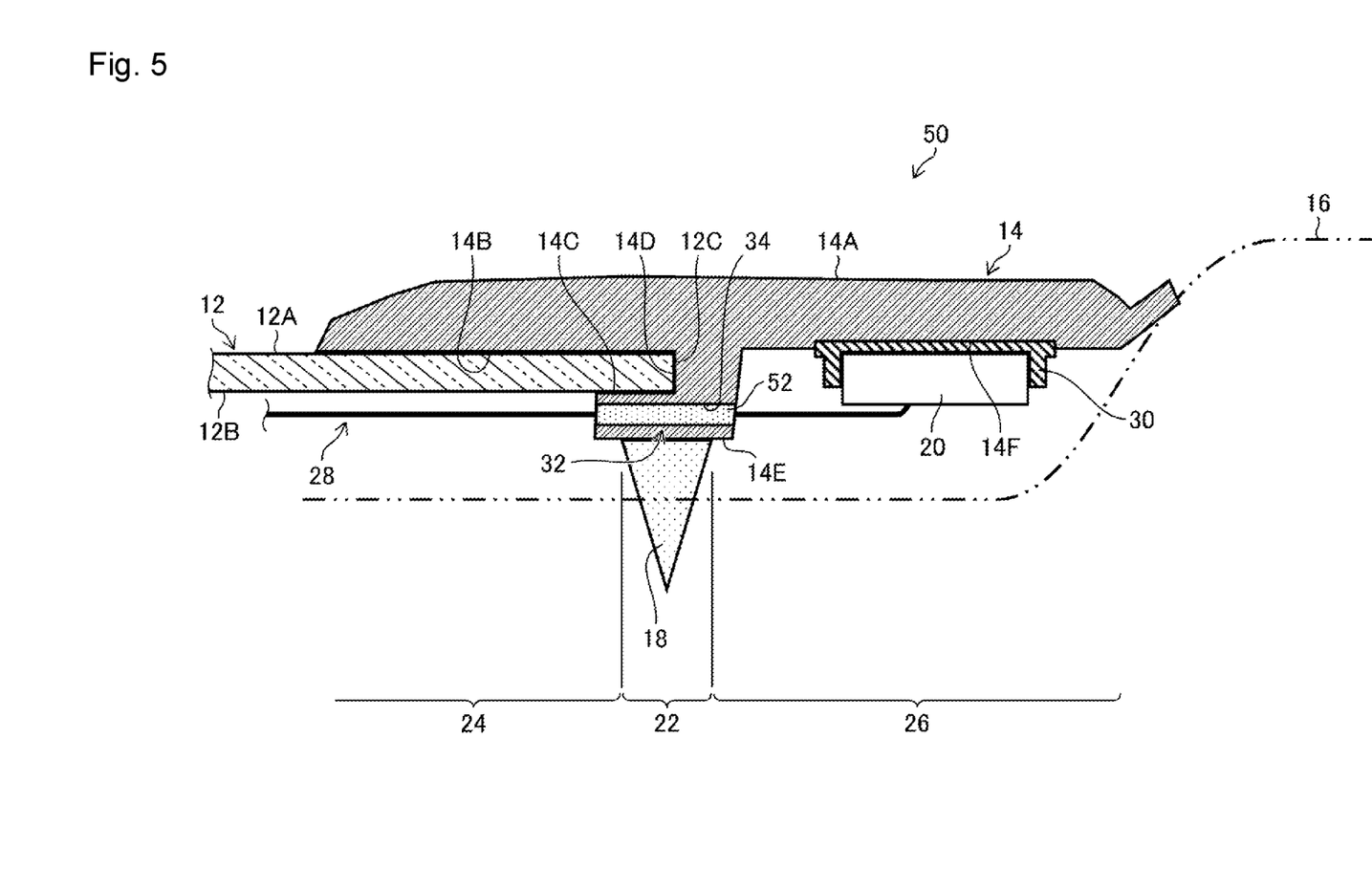
FIG. 5 is a cross-sectional view of the vehicle glass assembly with a resin frame according to a third embodiment of the present invention.

FIG. 5 is a cross-sectional view of the glass assembly with a resin frame 50 according to a third embodiment of the present invention. Regarding the explanation of the glass assembly with a resin frame 50, parts or members identical or similar to those of the glass assembly with a resin frame 10 shown in FIGS. 1 and 2 are indicated with like reference numeral, and explanation of these parts and members will be omitted.

The glass assembly with a resin frame 50 according to the third embodiment shown in FIG. 5 is a case where an electrical connection member 28 has a portion formed of a connector member 52 as a plate. The connector member 52 may be, for example, a flat harness with a connector. When this connector member 52 is adopted, the glass assembly with a resin frame is configured to have a relay portion 32 formed of the connector member 52 disposed so as to pass through a resin frame 14, the connector member 52 having a first end electrically connected to an electrical component 20 via the electrical connection member 28 and a second end electrically connected to the electrical connection member 28. In other words, the glass assembly with a resin frame 50 according to the third embodiment is configured to include a glass plate 12, the connector member 52 and the resin frame 14 formed as an integrally molded product such that the resin frame 14 and the connector member 52 are brought into close contact with each other. The connector member 52 has a primer applied to a surface thereof to further increase the close contact between the resin frame 14 and the connector member 52.

In the glass assembly with a resin frame 50 shown in FIG. 5, when the connector member 52 is disposed to pass through a through hole 34 formed in the resin frame 14, the through hole 34 has openings 34A and 34B at both ends, at least one of the openings (opening 34A) being sealed by a sealing member 36 as shown in FIG. 2.

In accordance with the glass assembly with a resin frame 50 of the third embodiment, even when moisture enters from a peripheral edge area of the glass assembly with a resin frame 50, the provision of an adhesive 18 can prevent the moisture from entering onto an in-plane side of the glass assembly with a resin frame 50.

In other words, the glass assembly with a resin frame 50 according to the third embodiment is configured such that the electrical component 20 disposed in a second section 26 and the electrical connection member 28 disposed in a first section 24 are electrically connected together via the connector member 52 as the relay portion 32 interposed between an outer side surface 14A and the inner side surface 14E with an adhesive 18 applied thereto. Because the resin frame 14 and the connector member 52 are brought into close contact with each other, the glass assembly with a resin frame according to the third embodiment is configured to prevent the watertightness in an applying area 22 from being reduced. Thus, the entrance of the moisture onto the in-plane side of the glass assembly with a resin frame 50 (leakage) can be avoided to provide the glass assembly with a resin frame 50 with good quality.

Now, the glass assembly with a resin frame according to a fourth embodiment (not shown) will be described. This glass assembly with a resin frame is configured such that the connector member 52 shown in FIG. 5 is integrally molded with the resin frame 14 as in the portion 28A of the electrical connection member 28 shown in FIG. 3. Even in the glass assembly with a resin frame thus configured, the provision of the adhesive 18 can prevent moisture from entering onto the in-plane side of the glass assembly with a resin frame to provide good quality to the glass assembly with a resin frame as in the glass assemblies with a resin frame 10, 40 and 50 according to the first to third embodiments.

In the glass assembly with a resin frame according to the fourth embodiment as well, it is preferable to utilize the auxiliary members 42 shown in FIG. 4 to support the connector member 52 by the mold. By this arrangement, the connector member 52 can be integrally molded with the resin frame 14. In this case, among the respective portions of the auxiliary members 42, the bottoms 42C of the leg portions 42B in contact with the mold are exposed outside from the inner side surface 14E of the resin frame 14. In other words, the glass assembly with a resin frame according to the fourth embodiment is an integrally molded product including the glass plate 12, the connector member 52, the auxiliary members 42 and the resin frame 14.

Now, modifications of the glass assembly with a resin frame according to the present invention will be described.

Figure 6:
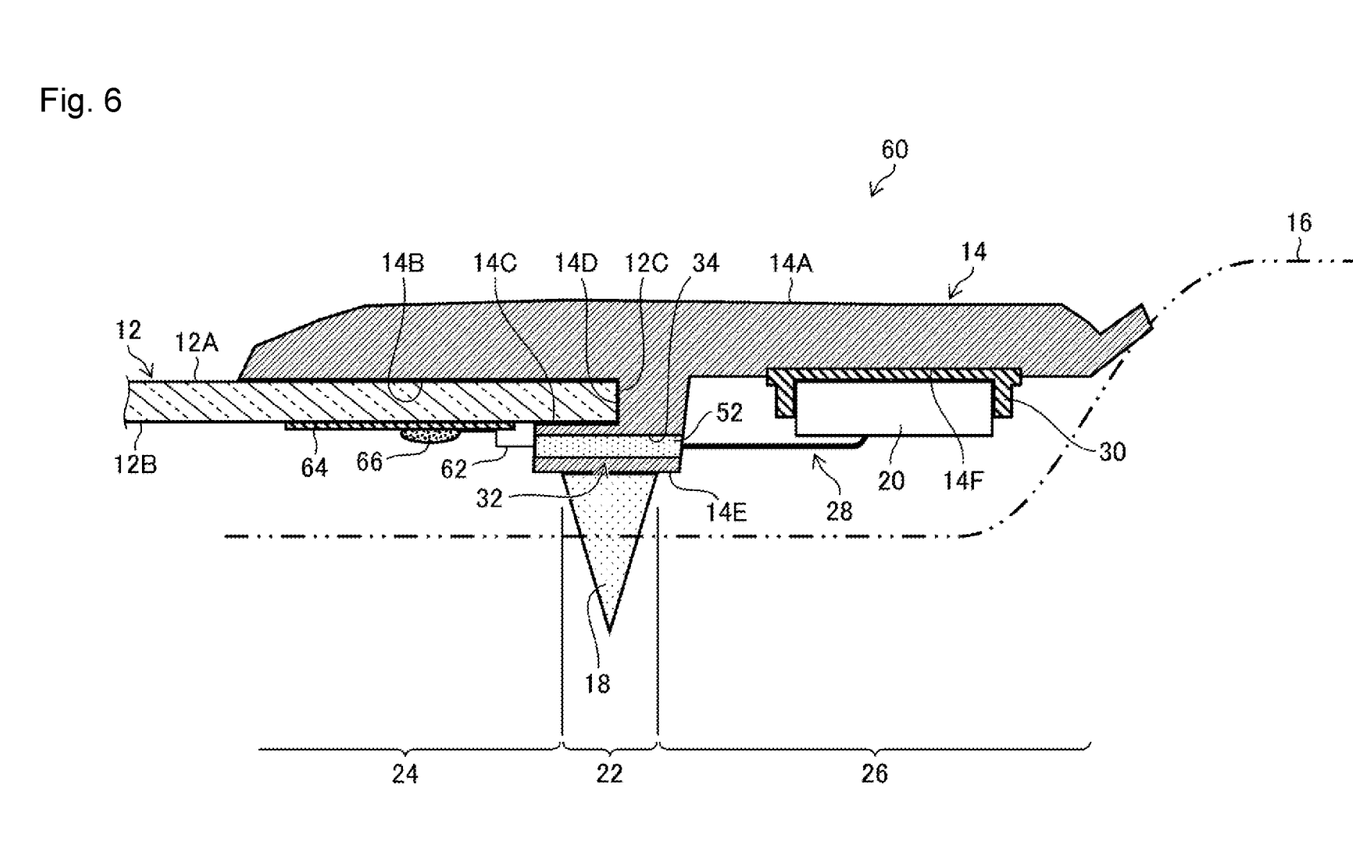
FIG. 6 is a cross-sectional view of the vehicle glass assembly with a resin frame according to another embodiment of the present invention.

The glass assembly with a resin frame 60 shown in FIG. 6 is configured to have a flat harness 62 (see FIG. 6) applied as the electrical connection member 28 connected to an end of the connection member 52 shown in FIG. 5. The glass assembly with a resin frame 60 has a bus bar 64 attached to an inner side surface 12B so as to be connected to the lead wire (not shown) of the flat harness 62, the bus bar 64 and the lead wire being connected together by a solder 66. The glass assembly with a resin frame 60 shown in FIG. 6 has the bus bar 64 disposed in a first section 24, the bus bar 64 being connected, via the flat harness 62, a connector member 52 and the electrical connection member 28, to an electrical component 20 disposed in a second section 26.

Even in the glass assembly with a resin frame 60 thus configured, the provision of an adhesive 18 can prevent moisture from entering onto an in-plane side of the glass assembly with a resin frame 60 to provide the glass assembly with a resin frame 60 with good quality.

Figure 7:
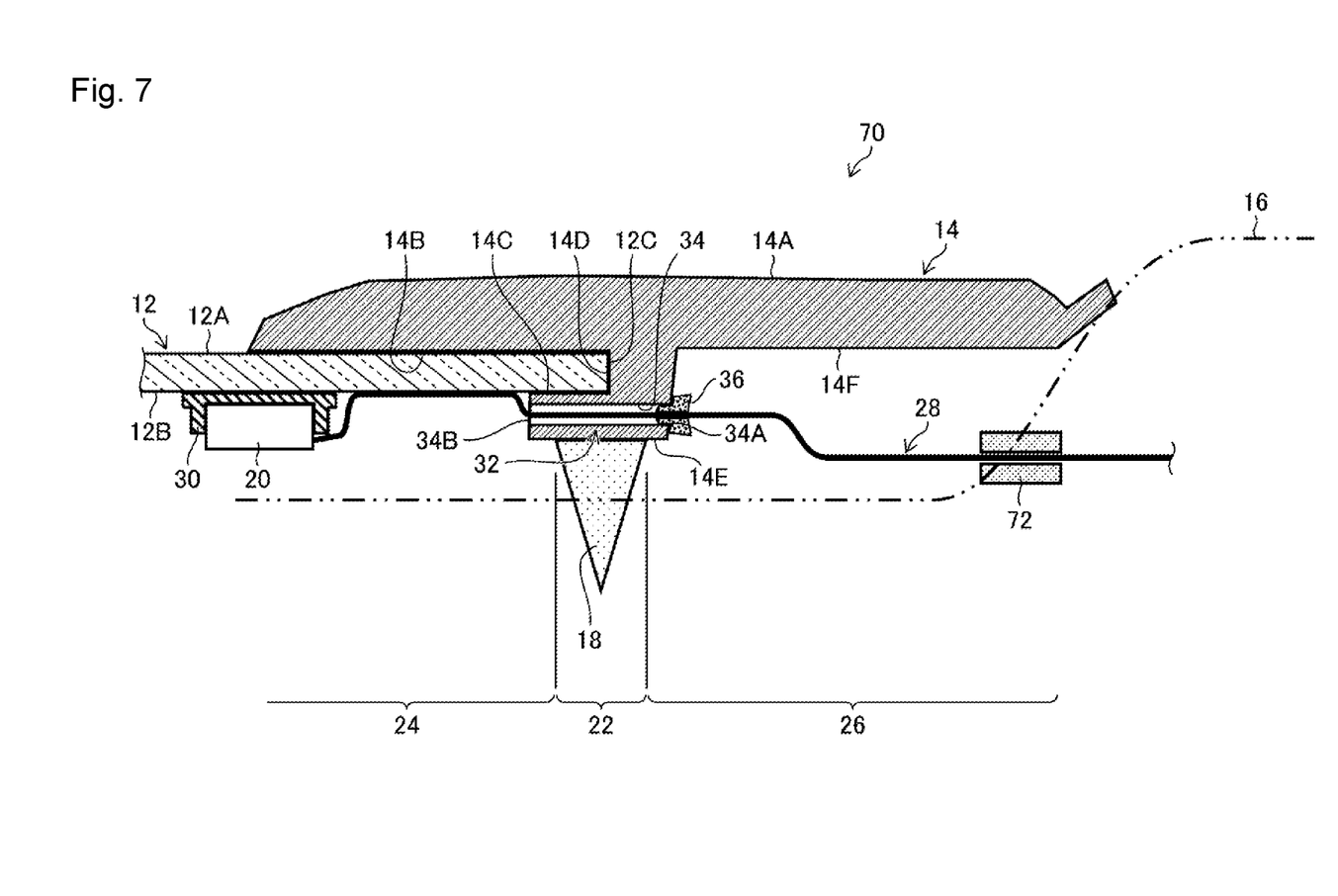
FIG. 7 is a cross-sectional view of the vehicle glass assembly with a resin frame according to still another embodiment of the present invention

The glass assembly with a resin frame 70 shown in FIG. 7 is configured to have an electrical component 20 disposed in a first section 24 and an electrical connection member 28 disposed in a second section 26. Specifically, the electrical component 20 is attached to an inner side surface 12B of a glass plate 12, and the electrical connection member 28 has a first end connected to the electrical component 20 via a through hole 34 formed in a resin frame 14, and a second end connected to, e.g., a power source of a vehicle 16.

Even in the glass assembly with a resin frame 70 thus configured, the provision of an adhesive 18 can prevent moisture from entering onto an in-plane side of the glass assembly with a resin frame 70 to provide the glass assembly with a resin frame 70 with good quality. It should be noted that the electrical connection member 28 is connected to the power source, passing through a cylindrical water cut-off packing 72 attached to an opening of the vehicle 16.

[Process for Producing Glass Assembly with Resin Frame]

Explanation will be made about an example of the producing a glass assembly with a resin frame according to the fourth embodiment in reference to the mold 80 shown in FIG. 8. Although it is shown in FIG. 8 that a molten resin 84 for forming the resin frame 14 has been already injected into a cavity 82 of the mold 80, the following explanation will be started from a state prior to the injection of the molten resin 84 into the cavity 82.

The production process described below broadly includes a step for attachment of a connector member, a step for attachment of a glass plate, and a step for molding a resin frame.

Figure 8:
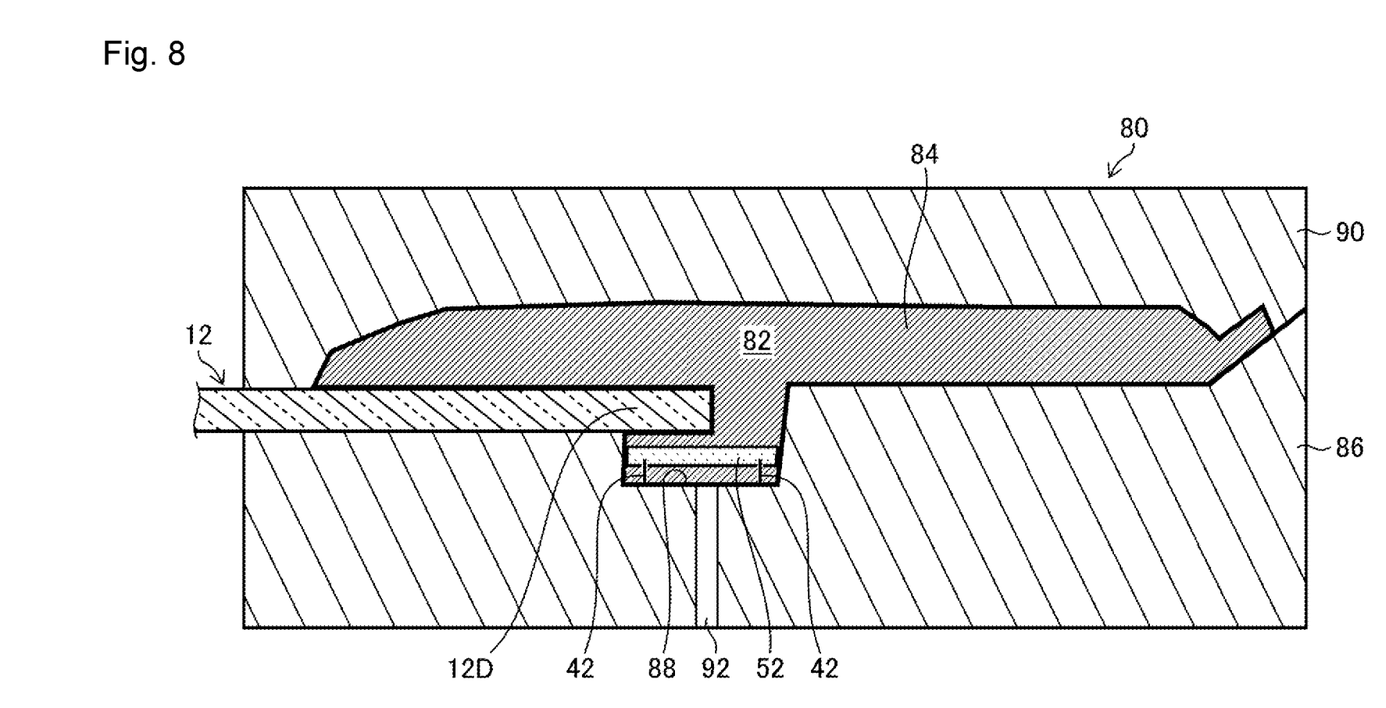
FIG. 8 is a cross-sectional view of a mold for producing the vehicle glass assembly with a resin frame according to a fourth embodiment of the present invention.

In the step for attachment of a connector member, the connector member 52 is set (placed), being combined with the auxiliary members 42 and 42, in a recess 88 of a bottom mold 86 forming the mold 80 as shown in FIG. 8.

In the next step for attachment of a glass plate, a glass plate 12 is set so as to have a peripheral edge area 12D placed at a certain position in the bottom mold 86 as shown in FIG. 8. After that, a top mold 90 of the mold 80 is fixed to the bottom mold 86. In this manner, the cavity 82 is formed between the bottom mold 86 and the top mold 90, and the connector member 52 and the peripheral edge area 12D of the glass plate 12 are accommodated in the cavity 82.

Lastly, in the step for molding a resin frame, the molten resin 84 is injected through a resin injection port 92, which is formed in, e.g., the bottom mold 86. Thus, the molten resin is gradually injected into the cavity 82, finally filling the cavity 82. After that, the bottom mold 86 and the top mold 90 are separated from each other when the molten resin is solidified. Thus, the glass assembly with a resin frame according to the fourth embodiment is produced. It should be noted that the resin injection port 92 may be formed in the top mold 90.

The glass assembly with a resin frame according to the present invention has been described in reference to some embodiments. The present invention is not limited to the above-mentioned embodiments. Various improvements or modifications can be made without departing from the spirit of the present invention.

The entire disclosure of Japanese Patent Application No. 2021-065230 filed on Apr. 7, 2021 including specification, claims, drawings and summary is incorporated herein by reference in its entirety.

What is claimed is:

1. A glass assembly with a resin frame for a vehicle window, comprising:
   a glass plate; and
   a resin frame disposed on a peripheral edge area of the glass plate, the resin frame being integrally molded to the glass plate;
   wherein the glass assembly is configured to be mounted to a vehicle;
   wherein the resin frame has an adhesive applied to an inner side facing the vehicle to fix the glass assembly to the vehicle;
   wherein the glass assembly has an electrical component disposed on the inner side;
   wherein the glass assembly has an adhesive applying area where the adhesive is applied, a first section, and a second section, the first section being closer to an in-plane side of the glass assembly than the adhesive applying area, and the second section being closer to the edge side than the adhesive applying area;
   wherein the electrical component is disposed in one of the first section and the second section;
   wherein the glass assembly has an electrical connection member disposed in a section other than the section where the electrical component is disposed; and
   wherein the electrical component and the electrical connection member are electrically connected together via a relay portion interposed between the adhesive applying section and an outer side surface as viewed in cross-section of the glass assembly.

2. The glass assembly according to claim 1, wherein the relay portion comprises a through hole disposed in the resin frame;
   wherein the electrical connection member is disposed so as to pass through the through hole; and
   wherein the through hole has openings at both ends, one of the openings being sealed with a sealing member.

3. The glass assembly according to claim 1, wherein the electrical connection member is partly integrally molded to the resin frame; and
   wherein the relay portion comprises a portion of the electrical connection member, which is integrally molded to the resin frame.

4. The glass assembly according to claim 3, wherein the electrical connection member includes an auxiliary member, which is brought into contact with the electrical connection member at the relay portion; and
   wherein the auxiliary member is at least partly exposed to outside from the resin frame.

5. The glass assembly according to claim 1, wherein the relay portion comprises a connector member disposed to pass through the resin frame;
   wherein the connector member has a first end electrically connected to the electrical component and a second end electrically connected to the electrical connection member.

6. The glass assembly according to claim 5, wherein the connector member is disposed so as to pass through the through hole disposed in the resin frame; and
   wherein the through hole has openings at both ends, one of the openings being sealed with a sealing member.

7. The glass assembly according to claim 5, wherein the connector member is integrally molded with the resin frame.

8. The glass assembly according to claim 7, wherein the connector member includes an auxiliary member, which is brought into contact with the connector member at the relay portion; and
   wherein the auxiliary member is at least partly exposed to outside from the resin frame.

9. The glass assembly according to claim 1, wherein the electrical connection member comprises a linear member or plate.

10. The glass assembly according to claim 2, wherein the electrical connection member comprises a linear member or plate.

11. The glass assembly according to claim 3, wherein the electrical connection member comprises a linear member or plate.

12. The glass assembly according to claim 4, wherein the electrical connection member comprises a linear member or plate.

13. The glass assembly according to claim 5, wherein the electrical connection member comprises a linear member or plate.

14. The glass assembly according to claim 6, wherein the electrical connection member comprises a linear member or plate.

15. The glass assembly according to claim 7, wherein the electrical connection member comprises a linear member or plate.

16. The glass assembly according to claim 8, wherein the electrical connection member comprises a linear member or plate.

\* \* \* \* \*